April 4, 1961
L. ARNETT ET AL
2,978,143
INGREDIENT SUPPLY SYSTEM FOR BEVERAGE DISPENSING APPARATUS
Filed April 25, 1955
2 Sheets-Sheet 1
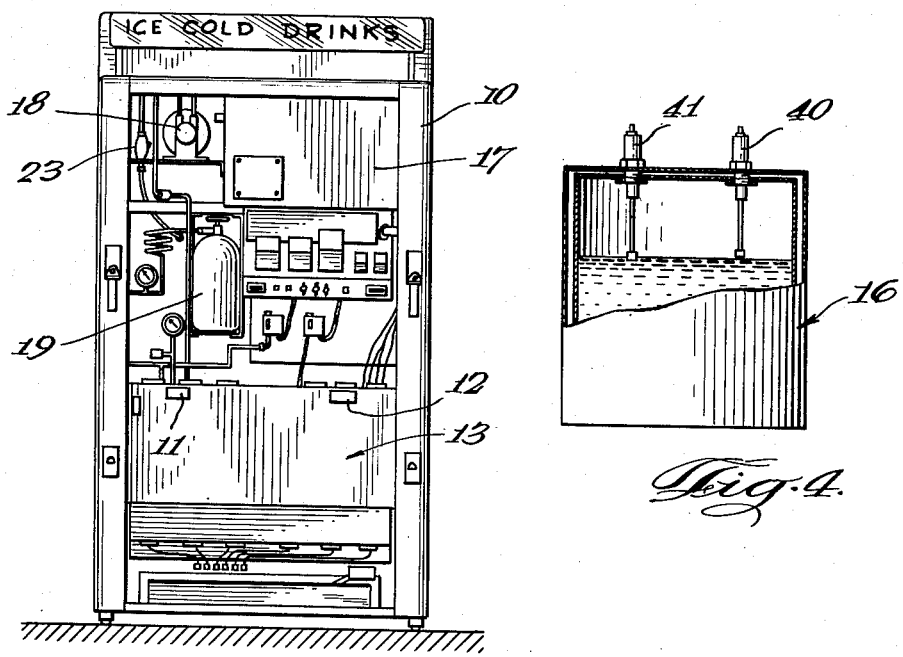
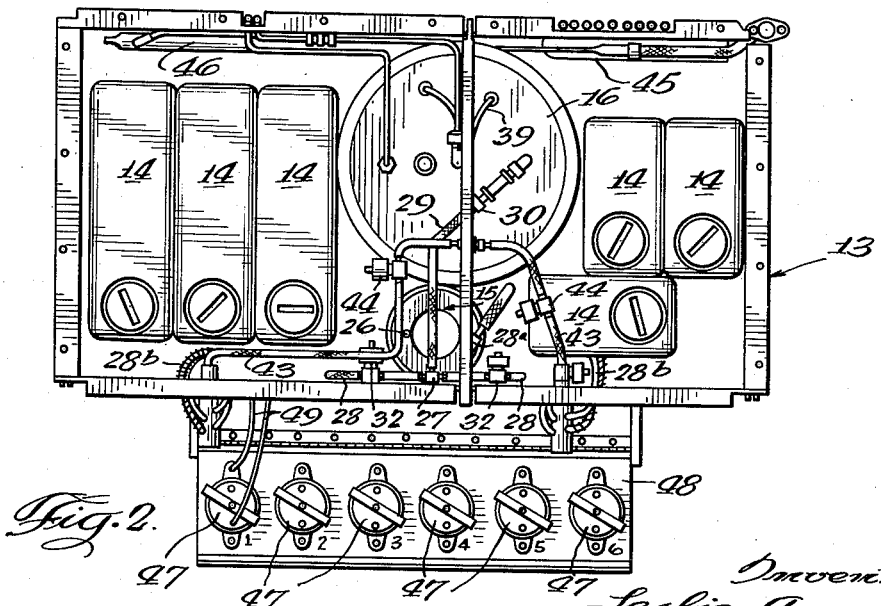

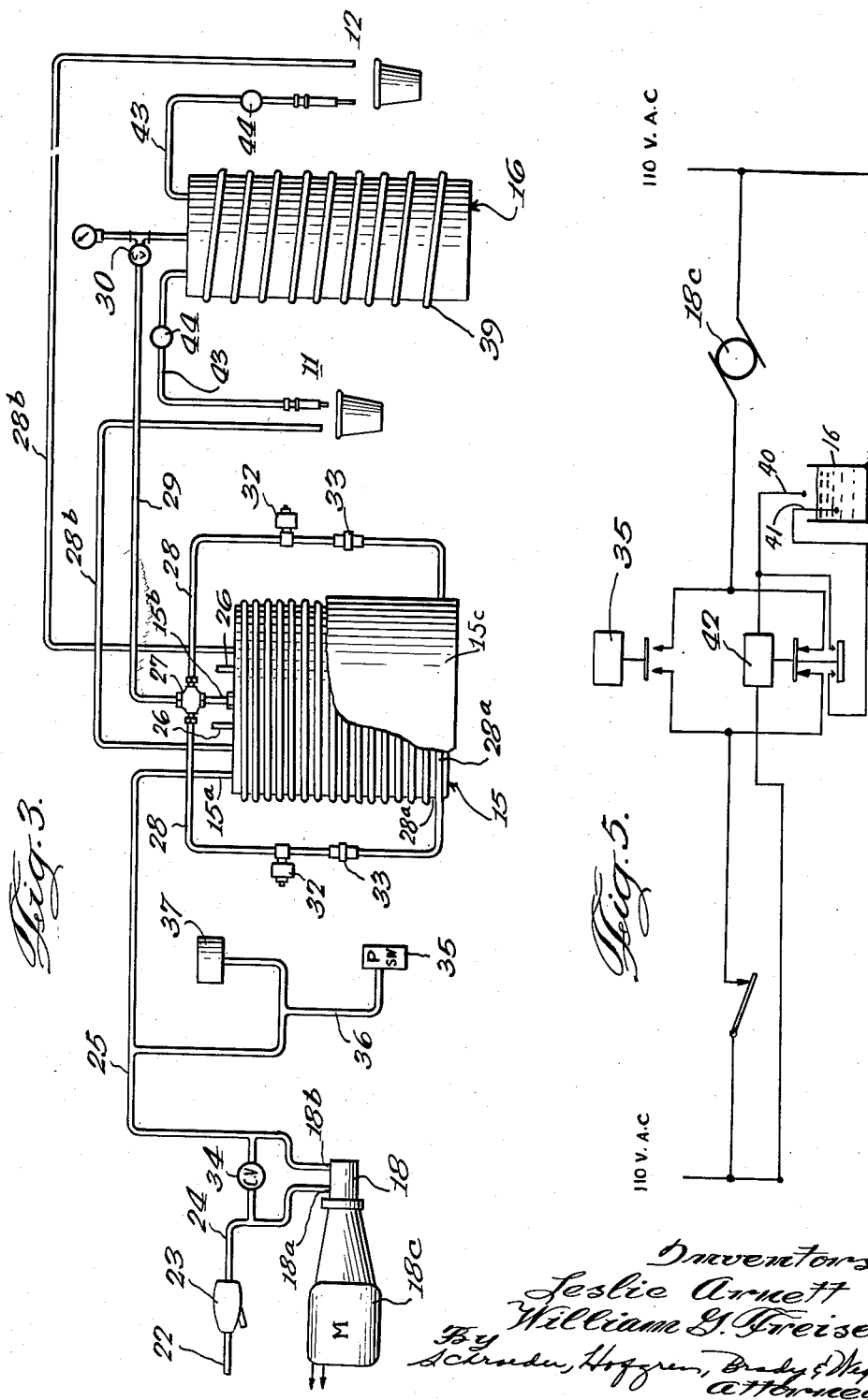

United States Patent Office 2,978,143
Patented Apr. 4, 1961

2,978,143
INGREDIENT SUPPLY SYSTEM FOR BEVERAGE DISPENSING APPARATUS

Leslie Arnett and William G. Freise, Chicago, Ill., assignors, by mesne assignments, to Square Manufacturing Company, Chicago, Ill., a corporation of Delaware Filed Apr. 25, 1955, Ser. No. 503,391
7 Claims. (Cl. 222—63)

This invention is concerned with a beverage dispensing apparatus and more particularly with a novel ingredient supply system for such apparatus.

Coin-operated beverage dispensing machines of various types are known and are used quite widely; being found in theater lobbies, train and bus stations, airports and other locations where large groups of people congregate. Generally speaking, such machines contain supplies of flavored syrups which are mixed with plain or carbonated water and delivered to a cup which is furnished from a supply within the machine. In most cases the machine is connected to a local pressurized water main and a refrigeration system within the machine cools the water to the desired temperature before dispensing. Electrical systems, including timing devices, are usually provided for controlling the operation of the various dispensing mechanisms in the machine.

We have devised and disclosed and claim herein a new and improved ingredient supply system for beverage dispensing machines in which pressure variations in the water supply do not affect the quantity of drink dispensed and in which the temperature of the ingredients dispensed is maintained as nearly constant as possible.

One feature of the invention is the provision of a water supply system comprising a pump having an inlet and an outlet, the inlet being adapted for connection with the pressurized water main, means connected to the outlet for dispensing water and means responsive to the pressure of the water at the outlet for operating the pump when the pressure falls below a predetermined point. Another feature is that the means connected to the pump outlet for dispensing water include a flow regulator. A further feature is that a carbonator has its inlet connected to the outlet of the water pump and means responsive to the level of water in the carbonator are provided for operating the pump.

Still another feature is the provision of a water cooler for a beverage dispensing apparatus, comprising a heat transfer device adapted to have a cooling medium circulated therethrough and having an inlet and an outlet for water, means for supplying water to the inlet of the device and a water delivery conduit connected to the outlet and arranged in heat transfer relation to the device for maintaining water in the delivery conduit cool. Yet a further feature is that a plurality of water delivery conduits are connected to the outlet of the heat transfer device, at least one of the conduits having a portion arranged in heat transfer relation with the device and having a valve therein intermediate the outlet and the portion.

And another feature is the provision of a beverage ingredient supply, comprising an insulated compartment, a plurality of syrup containers in the compartment, a water cooler in the compartment, a carbonator in the compartment, and means for cooling the compartment.

Further features and advantages will readily be apparent from the following specification and from the drawings, in which:

Figure 1 is a front elevational view of the interior of a beverage dispensing machine;

Figure 2 is a top plan view of the refrigerated ingredient compartment of the machine, with the cover removed;

Figure 3 is a schematic diagram of the water supply system;

Figure 4 is a side view, partially in section, of the carbonator; and

Figure 5 is a schematic diagram of the electrical circuit of the water pump motor.

Referring first to Figures 1 and 2, the elements of a beverage dispensing apparatus are contained within a cabinet 10, the front door of which is removed in the drawing to show the interior arrangement. The front door will carry on it a cup supply and cup dispensing mechanism, together with an arrangement for supporting a cup in an access opening adjacent a delivery point from which the beverage ingredients are dispensed into the cup. The machine shown has a dual dispensing system with two ingredient delivery points 11 and 12. Carried on the outside of the door of the machine may be suitable means, as a selector dial, by which the customer may select the particular drink he desires, together with a slot into which a suitable coin may be inserted to initiate operation of the machine. At the lower portion of cabinet 10 is a refrigerated compartment 13 within which are located supplies of flavored syrups 14 (six being shown), a water cooler 15 and a carbonator 16. The compressor and motor (not shown) of the refrigerating system are mounted in a compartment 17 at the top of the cabinet. Water to be mixed with the flavored syrups is supplied from a pressurized source, as a water main (not shown), through pump 18 to water cooler 15 in compartment 13. A tank 19 of carbon dioxide gas is connected to carbonator 16 which provides charged water for use with at least some of the drinks.

The beverage dispensing apparatus provides a choice of any one of six flavors of syrup and, with at least some of the syrups, a further choice of plain or carbonated water. As in many beverage dispensing machines, electrically operated valves control the dispensing of the plain and carbonated water and are opened for a predetermined time upon actuation of the machine permitting water to be dispensed. The particular circuits by which the valves are operated are unimportant to the present invention, it being necessary only that the valves open for a fixed period of time, as ten seconds. (Further details of a suitable control circuit may be found in copending Arnett et al. application, Serial No. 487,834, filed February 14, 1955, now abandoned.) A flow regulator in the water outlet line limits the amount of plain water dispensed during the period the valve is opened regardless of how high the water pressure in the line may be. It has been found however that in some localities the water pressure may be insufficient to cause the desired quantity of water to be delivered during the dispensing cycle. This situation cannot satisfactorily be compensated for by increasing the period of time the valve is open since the flow regulator will not function properly at low water pressures and low level pressure variations might still cause variations in the quantity of water dispensed.

Turning now to Figure 3, a water supply system which eliminates this problem will be described. Water from the main enters the machine through a pipe 22, strainer 23 and pipe 24 connected to the inlet 18a of a positive-displacement pump 18 driven by an electric motor 18c.

In most situations, pressurized water systems are available and the machine is preferably connected to them, but it will operate satisfactorily from any water source, as a storage tank. A pipe 25 connects the outlet 18b of the pump to the inlet 15a of water cooling device 15. Preferably, the refrigeration cooling medium from the compressor located in compartment 17, is circulated through the tubing 26 and suitable coils or ducts within the body of the heat exchange device. Water, after being cooled, leaves heat exchange device 15 through outlet 15b to which is connected a cross 27. Two plain-water dispensing conduits 28, one for each side of the machine, are connected to cross 27 while a single pipe 29 is connected between the cross and carbonator 16 through check valve 30. Electrically operated valves 32 and flow regulators 33 are provided in each of the plain-water dispensing conduits 28; and portions 28a of each of the conduits, intermediate valves 32 and dispensing points 11 and 12, are wrapped around the outside of water cooler 15 and in heat transfer relation therewith. The purpose of the particular arrangement of the water dispensing conduits will be discussed in detail later.

Under normal conditions, as when the pressure in the water main is between 30 and 50 pounds per square inch, plain water to be dispensed flows through check valve 34, connected between inlet 18a and outlet 18b of the pump and, under the control of flow regulator 33 a predetermined quantity of water is dispensed during the period of time valve 32 is opened. However, if the water pressure is exceedingly low, as less than 20 pounds per square inch, the flow regulator will not function properly and an insufficient quantity of water will be delivered. In order to eliminate such an occurrence, a pressure sensitive switch 35 is connected through tube 36 and pipe 25 to the outlet 18b of the pump and, when the water pressure in the line falls below a predetermined point, switch 35 is operated energizing water pump motor 18c. Switch 35 is preferably adjusted to close at relatively low pressure, as 25 pounds per square inch, and then to open after pump 18 has built up water pressure of 45 pounds at pump outlet 18b. An expansion chamber 37 is also connected to tube 36 and has a capacity of several ounces of water. The expansion chamber, which may contain a resilient bellows, acts to maintain the pressure in the system on the outlet side of the pump so that the pump will not be caused to run more than once or twice during the dispensing of each drink. Thus, the pressure in the water system of the dispensing apparatus is maintained above a predetermined minimum of pressure (here 20 pounds per square inch) regardless of variations of water pressure in the mains and, through the action of flow regulators 33, equal quantities of water are dispensed on each timed actuation of valves 32.

A high pressure is maintained in the interior of carbonator 16 due to its connection with tank 19 of carbon dioxide gas; and no flow regulator or pressure boost arrangement is necessary to control the amount of charged water dispensed. This pressure may vary from 60 to 100 pounds per square inch in accordance with the setting of the gas regulator, but is relatively constant for each machine. When it is desired to add plain, cooled water to the carbonator, pump 18 must be utilized to overcome the internal pressure of the carbonator. As shown in Figure 4, a pair of electrodes 40 and 41 extend into the interior of the carbonator and are connected through suitable circuits (as shown in Fig. 5) to close switch 42 and operate pump 18 maintaining the level of water in the carbonator between the levels of the bottoms of the electrodes. Reference may be made to Arnett Patents 2,519,533 issued August 22, 1950 and 2,761,200 issued September 4, 1956 for a detailed description of such liquid level control circuitry. At all times a large quantity of cold carbonated water is maintained in carbonator 16 and may be dispensed through conduits 43 on actuation of valves 44.

Since the water leaving cooling device 15 is utilized in a plurality of different places, the valves which control the flow of water must be placed in the system following the cooler. (Of course in a system which has only one dispensing point and utilizes only plain or carbonated water and not both, the valve could be inserted in the system at any desired point.) It has been found that the presence of the electrically operated valve and flow regulator structures in outlet conduits 28 has an appreciable warming effect on water standing therein so that the first drink dispensed after the machine has not been used for a period of time might be warm and unpalatable. In order that even the first drink be cold, portions 28a of each of the plain water outlet conduits 28 are wrapped around the outside of water cooler 15 and in heat transfer relation therewith so that the water standing therein is kept cool. While the portions 28b of plain water dispensing conduits 28, which extend between cooler 15 and the dispensing points 11 and 12 appear, in diagrammatic Figure 3 to be quite long, reference to Figure 2 will show that water cooler 15 is spaced intermediate dispensing points 11 and 12 and that portions 28b are actually only a few inches in length and most of this length is within the refrigerated cabinet 13. It should be noted that the water standing in conduit portions 28a and 28b is separated from the pressurized section of the system by valve 32 and is under zero pressure. An outer insulating covering 15c, as of sponge rubber, is placed over coils 28a to reduce further any warming. Thus, notwithstanding the warming effect of valves 32 and flow regulator 33, the water standing in plain water conduits 28 is kept cool so that the first drink dispensed after the machine has not been used, even after several hours, will be only a few degrees warmer than the temperature of the water within the water cooler.

This arrangement is not necessary in the carbonated water system for several reasons. First, the carbonator 16 has a coil 39 of tubing wrapped therearound which forms a part of the circulating system for the refrigerant so that in addition to receiving cooled water initially, the carbonator itself is further cooled. Furthermore, as the pressure within the carbonator 16 is maintained substantially constant there is no need for flow regulators in the carbonated water outlet conduits 43 and carbonated water standing in the dispensing conduits 43 is not warmed as much as plain water standing in conduits 28.

The refrigerating medium, which is cooled and condensed by apparatus located in compartment 17, is circulated first through tubing 26 in the body of water cooler 15, then through coil 39 associated with carbonator 16 and from there to right and left cold plates 45 and 46, respectively, mounted against the rear wall of compartment 13. This arrangement provides the greatest cooling for the warm water as it comes into the heat transfer device 15, maintaining it at 40° F. or below. The additional cooling of the carbonator by coil 39 maintains the carbonated water therein at about 33° F. The cumulative effect of the water heat exchange device 15, carbonator 16 and cold plates 45 and 46 serves to keep the interior of the entire chamber, including the syrup supplies, at a temperature of 50°-55° F.

Syrup dispensing pumps 47, there being one for each syrup supply, are mounted on a hinged panel 48 on the front of chamber 13 and are normally positioned within the chamber, panel 48 being shown in the open position in Figure 2. The various hoses 49 which carry the syrup from supply containers 14 to pumps 47 and from the pumps to dispensing points 11 and 12 are practically entirely contained within refrigerated compartment 13, only a few inches of each of the hoses leading to dispensing points 11 and 12 being outside the chamber. (Only one set of hoses 49 are shown to avoid confusing the drawing, it being understood that in practice there is a set of hoses for each pump.) Thus, all the ingredients for the dispensed beverages and substantially all the apparatus associated therewith are maintained at a reduced temperature of 55° or lower.

While we have shown and described certain embodiments of our invention, it is to be understood that it is capable of many modifications. Changes therefore, in the construction and arrangement may be made without departing from the spirit and scope of the invention as disclosed in the appended claims.

We claim:

1. In a beverage dispensing apparatus, a water supply system of the character described, comprising: a pump having an inlet and an outlet, the inlet being adapted for connection to a source of water under pressure; means bypassing the pump for conducting water from the inlet to the outlet whenever the pressure of the outlet is below that of the inlet; means connected to said outlet for dispensing water; means responsive to the outlet pressure of the water for operating said pump to cause the outlet pressure to be a first predetermined pressure when the inlet pressure is insufficient to maintain the outlet pressure at said preselected predetermined pressure; and means responsive to a preselected low volume condition of the water in said means for dispensing water to operate said pump to cause the outlet pressure to be a second predetermined pressure higher than said first predetermined pressure.

2. The water supply system of claim 1 wherein the means for dispensing the water includes a first flow path means for dispensing water at the first predetermined pressure, and a second flow path means having an enclosure containing water at the second predetermined pressure and controlled means for dispensing the water from the enclosure.

3. The water supply system of claim 2 wherein the means responsive to a condition of the water in the dispensing means comprises means operating the pump whenever the level of water in the enclosure of the second flow path means falls below a preselected level.

4. In a beverage dispensing apparatus, a water supply system of the character described, comprising: a pump having an inlet and an outlet, the inlet being adapted for connection to a source of water; means bypassing the pump for conducting water from the inlet to the outlet whenever the pressure of the outlet is below that of the inlet means connected to said outlet for dispensing plain water; means responsive to the pressure of the water for operating said pump when the pressure is insufficient to maintain the outlet pressure at a predetermined point; a carbonator adapted to be operated at a high internal pressure and having an inlet connected to the outlet of said pump; and means responsive to the level of liquid in said carbonator for operating said pump to maintain a predetermined level of water in the carbonator.

5. In a coin-operated automatic beverage dispensing apparatus, a water supply system of the character described, comprising: a pump having an inlet and an outlet, the inlet being adapted for connection to a water main subject to variations in pressure; means, including a valve and a constant flow regulator device, connected to said outlet for dispensing a predetermined quantity of plain water in a predetermined period of time; a check valve connected between the inlet and outlet of said pump and permitting a flow of water to by-pass the pump; an expansion chamber connected to the outlet of said pump; switch means responsive to the pressure of the water at the outlet of the pump for operating the pump when the pressure falls below a predetermined point; a carbonator adapted to operate at a high internal pressure and having an inlet connected to the outlet of said pump; a check valve in the inlet of said carbonator; and means in parallel with said switch means, responsive to the level of liquid in said carbonator for operating the pump to maintain the level of liquid in the carbonator above a predetermined point.

6. Beverage dispensing apparatus comprising: means defining a flow passage having an inlet connected to a supply of water under pressure and an outlet connected to a dispensing device; a check valve in the flow passage permitting flow of the water only in the direction from the inlet to the outlet; a pump having a suction portion connected to said flow passage means upstream of the check valve and a discharge portion connected to said flow passage means downstream of the check valve; and control means responsive to the pressure at the discharge portion causing operation of the pump whenever the pressure at the discharge portion falls below a predetermined low value and discontinue operation of the pump when the pressure at the discharge portion rises above a predetermined high value to maintain the pressure at the discharge portion between said predetermined values.

7. The beverage dispensing apparatus of claim 6 wherein the control further includes means causing operation of the pump selectively to raise the pressure at the discharge portion to a second predetermined high value substantially higher than said first predetermined high value.

References Cited in the file of this patent

UNITED STATES PATENTS

| 1,566,591 | Goldsmith et al. | Dec. 22, 1925 |
| 1,786,804 | Weil | Dec. 30, 1930 |
| 1,826,089 | Persons | Oct. 6, 1931 |
| 2,127,848 | Smith | Aug. 23, 1938 |
| 2,261,338 | Carlson | Nov. 4, 1941 |
| 2,278,225 | Taylor | Mar. 31, 1942 |
| 2,303,716 | Arndt | Dec. 1, 1942 |
| 2,328,110 | Thompson et al. | Aug. 31, 1943 |
| 2,339,957 | Smith | Jan. 25, 1944 |
| 2,545,614 | Goldberg | Mar. 20, 1951 |
| 2,554,322 | Buckhorn | May 22, 1951 |
| 2,657,628 | Von Stoeser | Nov. 3, 1953 |
| 2,732,804 | Sadler et al. | Jan. 31, 1956 |
| 2,776,074 | St. Laurence | Jan. 1, 1957 |
| 2,781,831 | Angell | Feb. 19, 1957 |

FOREIGN PATENTS

| 618,520 | Great Britain | Feb. 23, 1949 |